Patented May 13, 1952

2,596,126

UNITED STATES PATENT OFFICE 2,596,126

METHOD FOR SEPARATING DIARYL-2-IMINO HYDANTOINS FROM THE CORRESPONDING 2,5-DI-IMINO GLYCOLURILS

Homer W. Carhart, Washington, D. C., and Peyton C. Teague, Forest Hills, Md.

No Drawing. Application February 24, 1943, Serial No. 476,930

6 Claims. (Cl. 260—309)

(Granted under the act of March 3, 1883, as amended April 30, 1928; 370 O. G. 757)

This invention relates to a method for separating diaryl 2-imino hydantoins from the corresponding 2,5-diimino glycolurils.

Prior work carried on in conjunction with others has shown that the imino derivatives of diaryl hydantoins and glycolurils can be made by the condensation of guanidine carbonate with a diaryl diketone, such as benzil, in solvents such as ethyl alcohol. The condensation gives mainly a mixture of the diaryl 2-imino hydantoin and the corresponding 2,5-diimino glycoluril, which usually must be separated for use, both from each other and from the solvent. There are various ways of separating the mixture from the solvent, which include (1) precipitation with excess cold water and filtering (2) precipitation with acetic acid, filtering off the hydantoin and precipitating the glycoluril with a base (3) chilling the mixture and filtering, and (4) chilling the mixture, saturating it with carbon dioxide and filtering. The fourth method is generally preferred because it lessens the solvent recovery problems of methods 1 and 2, and it precipitates the products more completely than the third method.

However, the fourth method leaves the hydantoin and gylcoluril derivatives as a mixed precipitate. Two methods have been used heretofore for separating these products, which comprise (a) leaching the precipitate with warm, dilute acetic acid, to dissolve the glycoluril, and precipitating the latter from the acid with a base, or (b) leaching the precipitate with hot water, in which the gylcoluril is sparingly soluble. There are disadvantages to both of these methods. The acetic acid separation works satisfactorily on small preparations (say of about one mole), but with larger amounts it is difficult to leach out the gylcoluril completely. Also the volume of acetic acid required (about eight liters per mole of glycoluril) is undesirably large. The hot water separation is unsatisfactory due to the difficulty of handling the very large volume required, and some glycoluril is lost because of its slight solubility in cold water.

This invention provides a method of separating the 2-imino diaryl hydantoins:

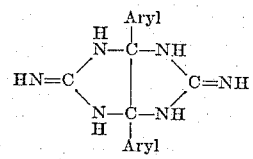

from the corresponding 2,5-diimino glycolurils:

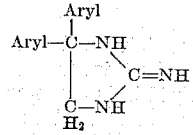

which is more efficient than the prior known methods. For example, smaller volumes of solution are necessary and the amounts of the products unavoidably lost are much less. In particular, the invention provides an especially desirable method of separating the condensation products of guanidine carbonate and benzil, namely 2-imino-5,5 diphenyl-hydantoin and 2,5-diimino-7,8-diphenyl glycoluril.

The method of this invention is based on the fact that both the hydantoin and the glycoluril derivative are soluble in strong mineral acids, particularly hydrochloric acid, and can be fractionally precipitated by adjusting the pH of the solution. Briefly, the mixed precipitate is made into an aqueous slurry and the acid (e. g. hydrochloric) is added until substantially all the material is dissolved. This occurs at a pH of about 1.0. Then a buffer (e. g. a salt of a strong base and weak acid) having a pH greater than 7 is added until the pH of the solution rises to between about 2.8 and 3.0, and the hydantoin derivative is fully precipitated (generally along with small amounts of the gylcoluril). After filtering off the hydantoin the glycoluril is recovered from the filtrate by addition of a strong base.

A typical separation made in accordance with this invention is described in the following example, the proportions being given for a one-mole run.

Example

The products of guanidine carbonate-benzil condensation in 95% ethanol are completely precipitated by chilling the solution and saturating it with carbon dioxide. The use of solid carbon dioxide, or Dry Ice, is very satisfactory for this purpose. The precipitate is filtered off and sucked as dry as possible. In order to remove any unreacted guanidine carbonate the filter cake is suspended in two liters of water, stirred for fifteen minutes and filtered. The precipitate is then treated with four liters of 1.7% hydrochloric acid at 30° to 35° C. and stirred. Most of the solid dissolves. If the pH of the solution is greater than 1.0 more acid should be added. If it is desired to obtain 2-imino-5,5-diphenyl hydantoin in pure form the residue (which may be unreacted benzil or other impurities) is filtered off at this point.

Whether or not the residue is removed at this point the pH of the mixture is raised to between about 2.8 to about 3.0 by the addition of a buffer salt, say a 25% aqueous solution of sodium acetate. Some of the glycoluril derivative may precipitate during addition of the sodium acetate, due to local alkalinity, but it redissolves on stirring. For the quantities given in this example a permanent precipitate of the hydantoin derivative usually forms after the addition of about 500 ml. of the sodium acetate solution. The sodium acetate is added more slowly after this until the pH reaches 2.8 to 3.0. (The pH is most easily determined electrometrically.) This requires about 100 to 200 ml. more. Care should be taken not to let the pH rise above about 3.0 or the glycoluril derivative will come out of solution. The precipitated 2-imino-5,5-diphenyl hydantoin is filtered off, or otherwise removed, at this point.

The filtrate, which contains the 2,5-diimino-7,8-diphenyl glycoluril is made alkaline to phenolphthalein (i. e. pH between about 8.3 and about 10) by the addition of a strong base (e. g. 25% sodium hydroxide), cooled, filtered, washed with water and dried. If the sodium hydroxide is added slowly with stirring at a temperature of about 40° to 45° C. and then the mixture is allowed to cool slowly over night, a coarser precipitate is obtained.

Although the above example describes specifically the separation of the diphenyl derivatives of 2-imino hydantoin and 2,5-diimino glycoluril, the process disclosed is equally applicable to other diaryl derivatives, such as the ditolyl, dixylyl, phenyltolyl and the like.

Many variations will be apparent to those skilled in the art, and the invention should not be limited other than as defined by the appended claims.

The invention described herein may be manufactured and used by or for the Government of the United States of America for governmental purposes without the payment of any royalties thereon or therefor.

We claim:

1. Method for separating a mixture comprising essentially 2-imino-5,5-diaryl hydantoin and 2,5-diimino-7,8-diaryl glycoluril which comprises preparing an aqueous slurry of said mixture, adding a mineral acid to said slurry until most of the solids are dissolved, adding a salt of a strong base and weak acid to said slurry until the pH thereof is between about 2.8 and about 3.0, removing the precipitated material consisting essentially of the 2-imino-5,5-diaryl hydantoin from the solution, adding a strong base to the solution until no further precipitation takes place and removing the precipitated 2,5-diimino-7,8-diaryl glycoluril from the solution.

2. Method as claimed in claim 1 wherein said hydantoin is 2-imino-5,5-diphenyl hydantoin and said glycoluril is 2,5-diimino-7,8-diphenyl glycoluril.

3. Method for separating a mixture comprising essentially 2-imino-5,5-diphenyl hydantoin and 2,5-diimino-7,8-diphenyl glycoluril which comprises preparing an aqueous slurry of said mixture, adding a mineral acid to said slurry until the pH thereof is at least about 1.0, adding an alkali acetate to the resulting solution until the pH thereof is between about 2.8 and about 3.0, removing precipitated material consisting essentially of the 2-imino-5,5-diphenyl hydantoin from the solution, adding a strong base to said solution until the pH is between about 8.3 and 10, and removing the precipitated 2,5-diimino-7,8-diphenyl glycoluril from the solution.

4. Method for separating a mixture comprising essentially 2-imino-5,5-diphenyl hydantoin and 2,5-diimino-7,8-diphenyl glycoluril which comprises preparing an aqueous slurry of said mixture, adding hydrochloric acid to said slurry until the pH thereof is at least about 1.0, adding sodium acetate to the resulting solution until the pH thereof is between about 2.8 and about 3.0, filtering precipitated material consisting essentially of the 2-imino-5,5-diphenyl hydantoin from the solution, adding alkali hydroxide to the filtrate until the pH is between about 8.3 and 10, and filtering the precipitated 2,5-diimino-7,8-diphenyl glycoluril from the solution.

5. Method as claimed in claim 4 which additionally includes filtering said slurry just prior to the addition of the sodium acetate, during a pH of about 1.0, to remove impurities.

6. In a separation method, the step of alkalizing an acid solution of 2-imino-5,5-diaryl hydantoin and 2,5-diimino-7,8-diaryl glycoluril to a pH of between 2.80 and 3.0, and removing the precipitated 2-imino-5,5-diaryl hydantoin.

HOMER W. CARHART.
PEYTON C. TEAGUE.

No references cited.